Figure 1:
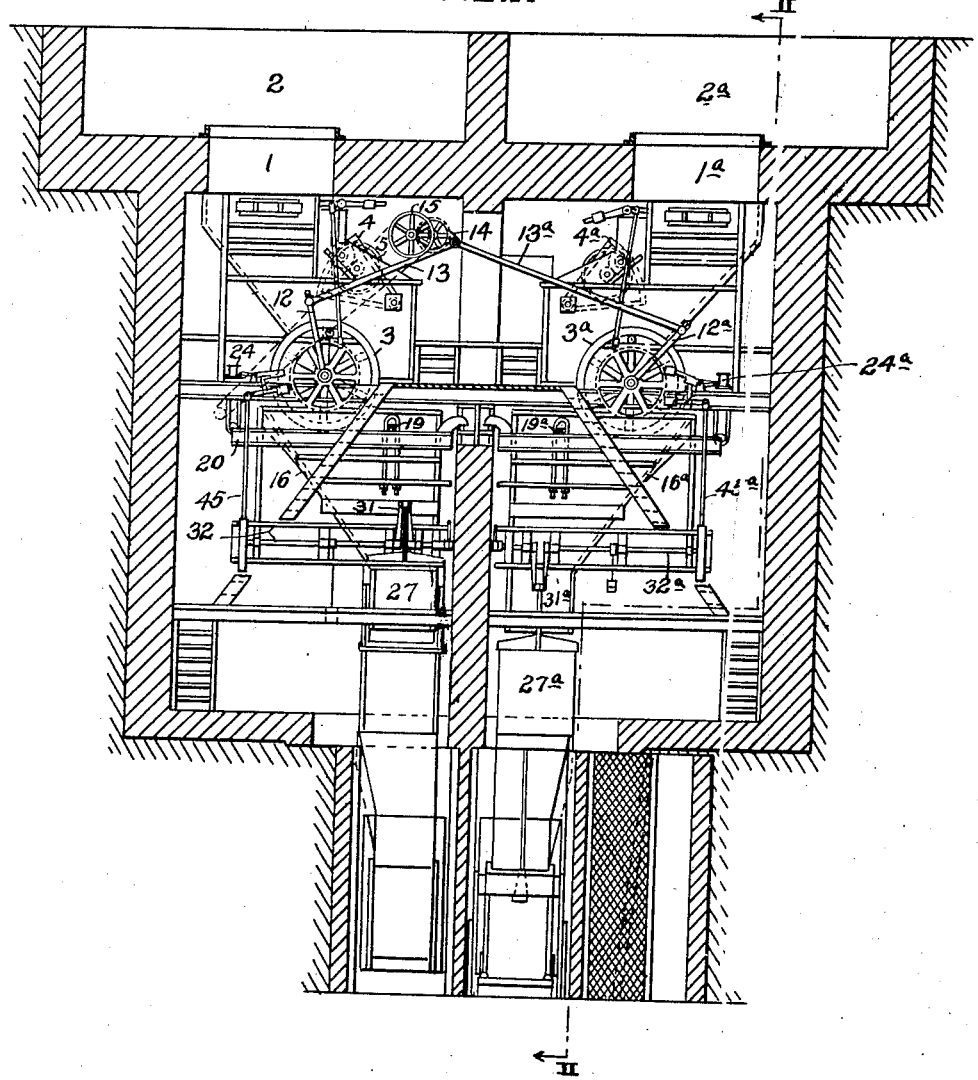

H. K. BURCH.
HOISTING APPARATUS.
APPLICATION FILED NOV. 8, 1916.

1,334,220.

Patented Mar. 16, 1920.
6 SHEETS—SHEET 1.

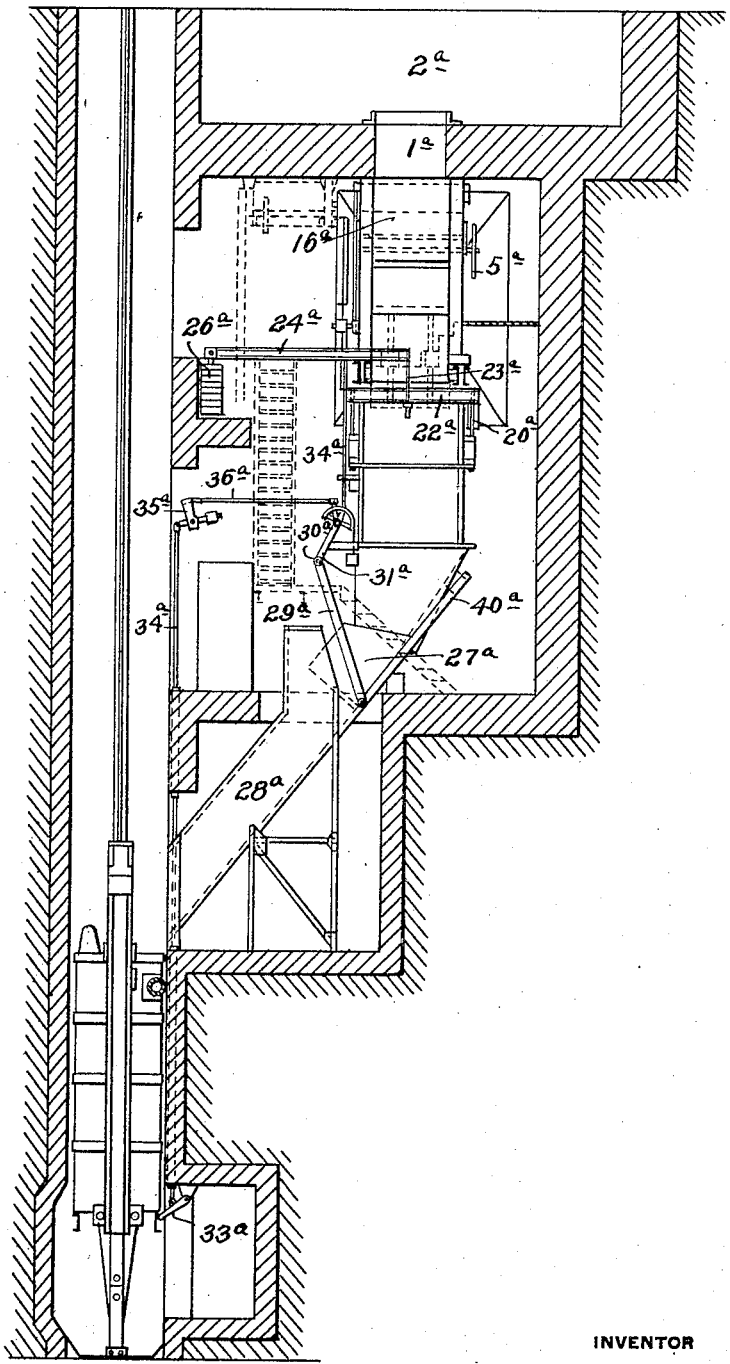

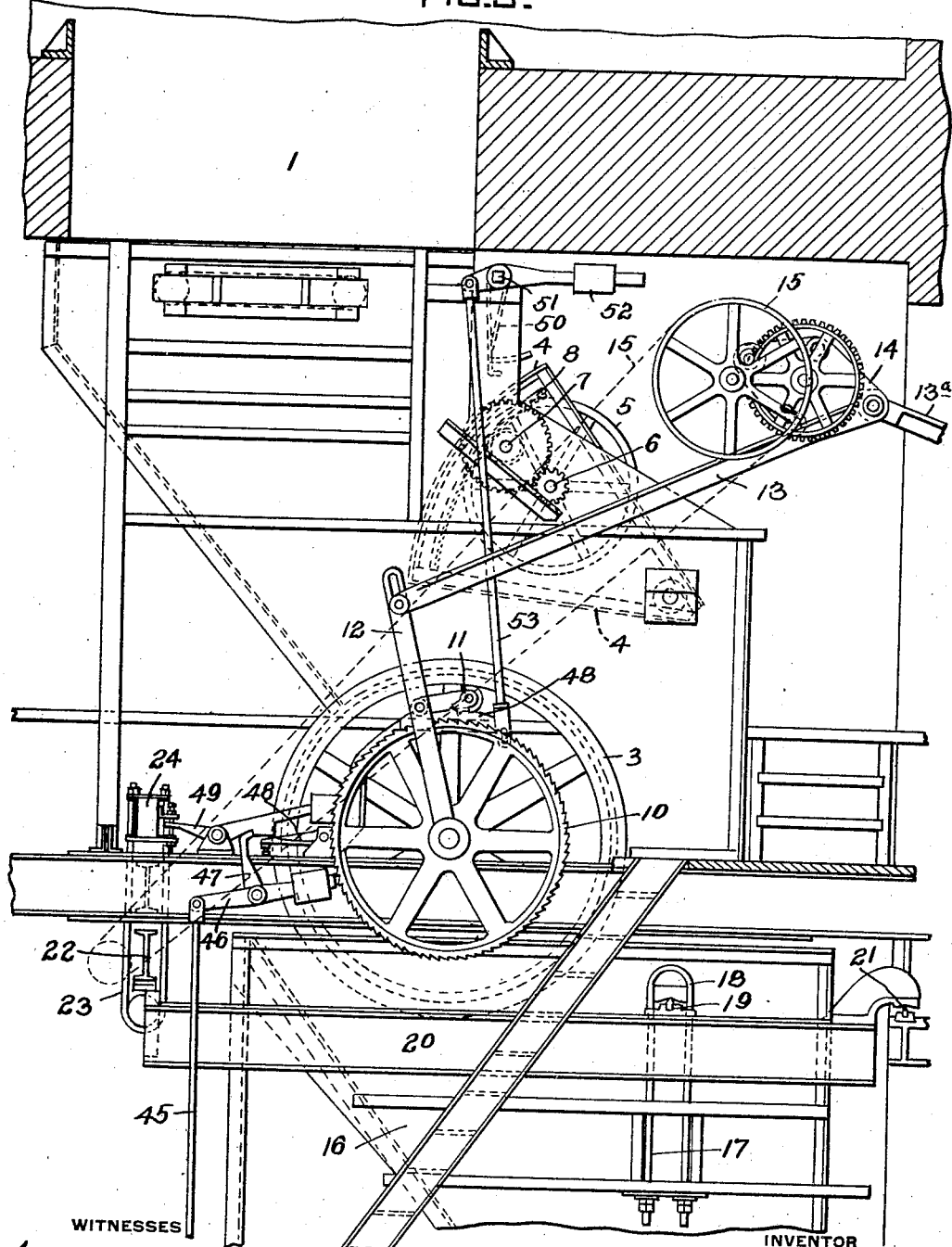

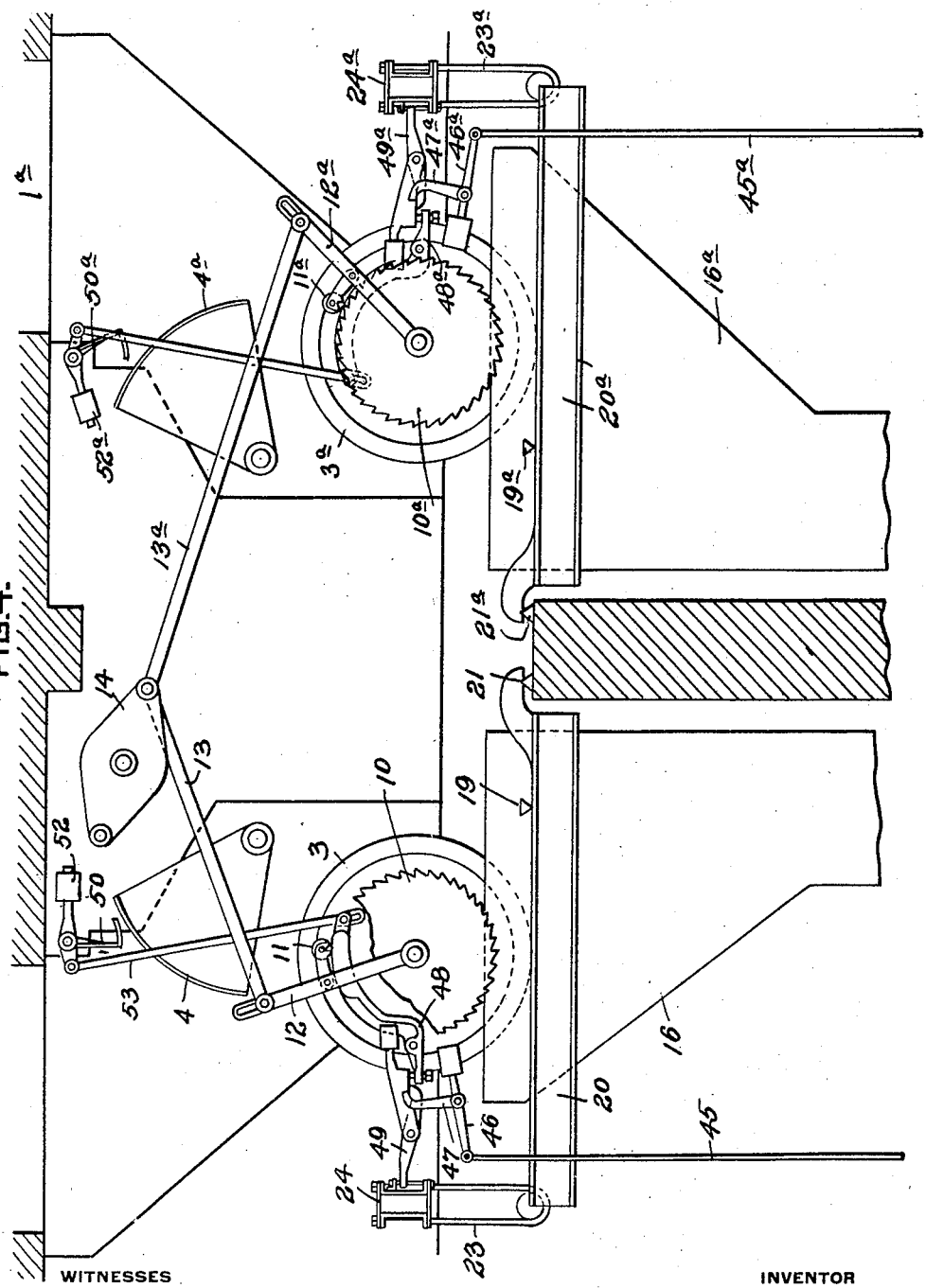

H. K. BURCH.
HOISTING APPARATUS.
APPLICATION FILED NOV. 8, 1916.
1,334,220.
Patented Mar. 16, 1920.
6 SHEETS—SHEET 5.
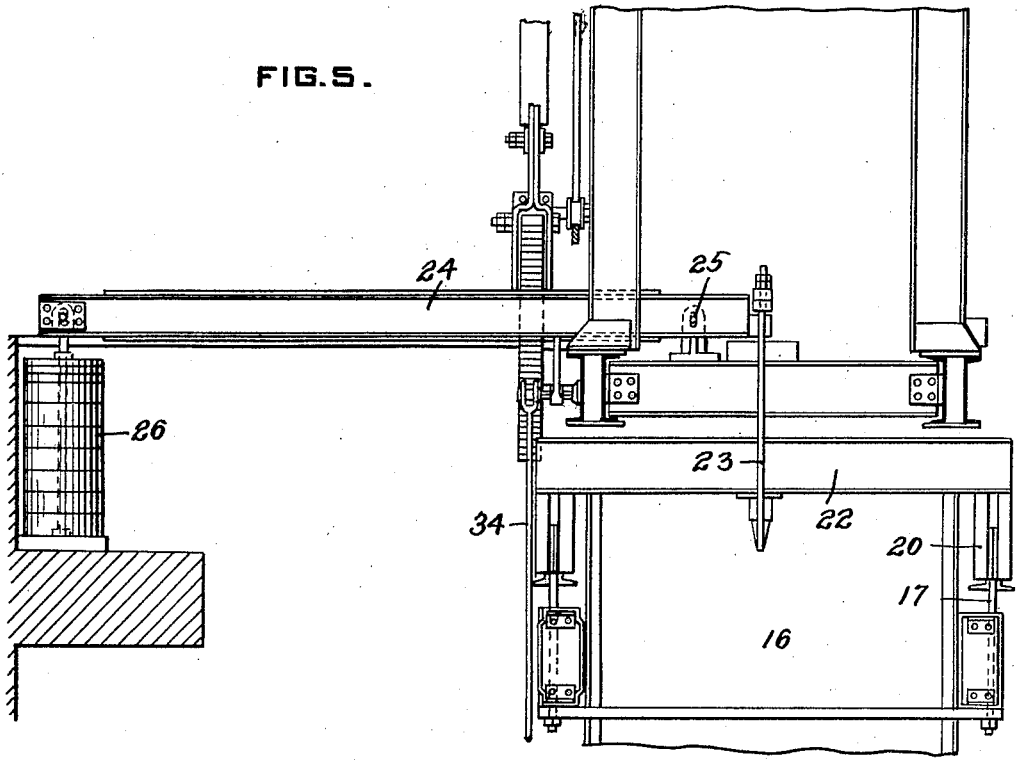
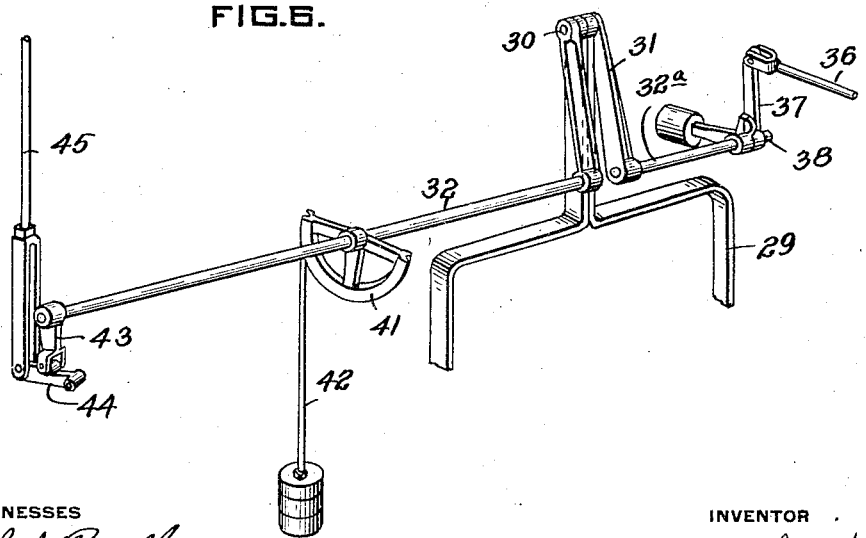

H. K. BURCH.
HOISTING APPARATUS.
APPLICATION FILED NOV. 8, 1916.
1,334,220.
Patented Mar. 16, 1920.
6 SHEETS—SHEET 6.
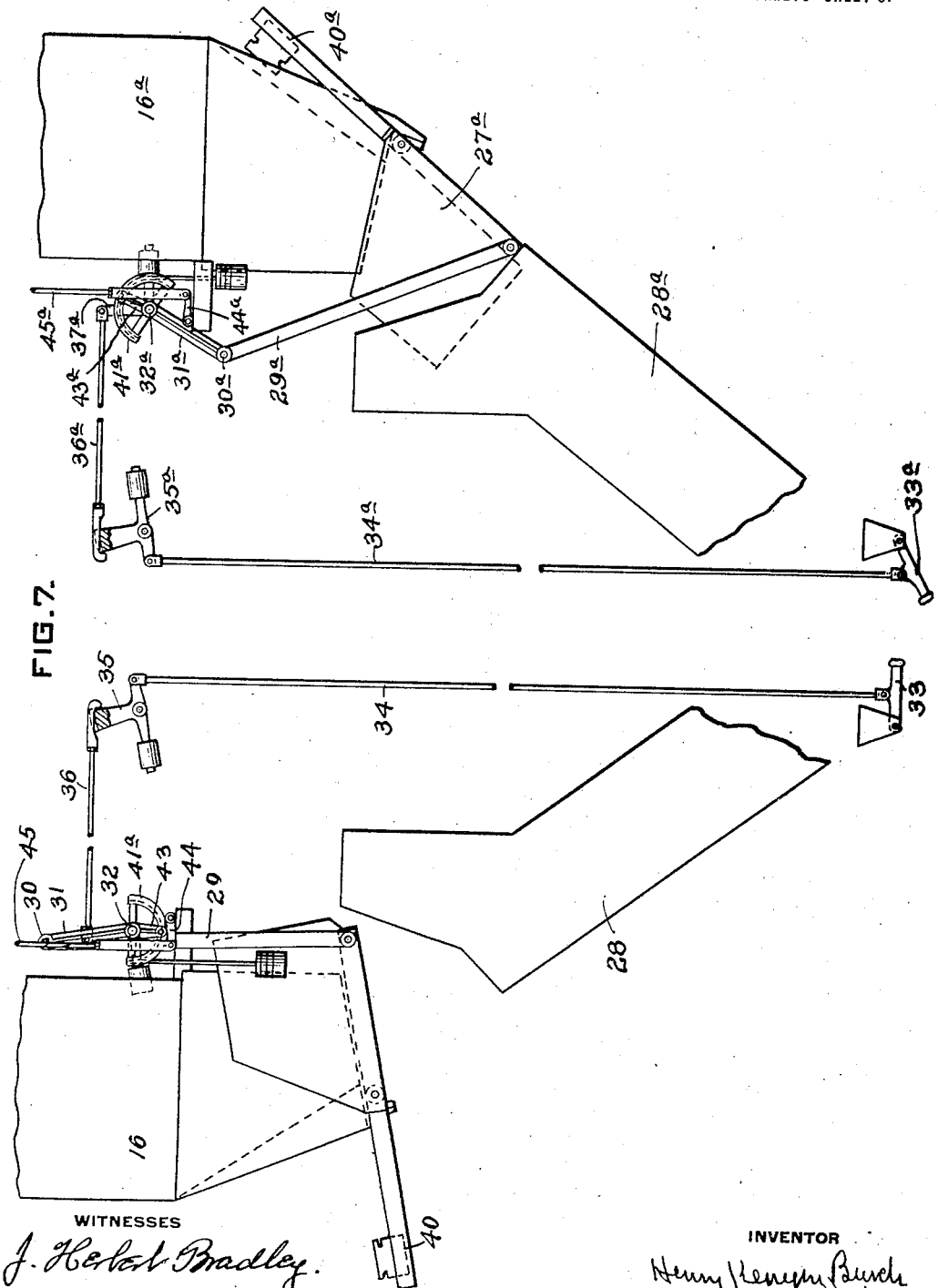

UNITED STATES PATENT OFFICE.

HENRY KENYON BURCH, OF MIAMI, ARIZONA.

HOISTING APPARATUS.

1,334,220.  Specification of Letters Patent.  Patented Mar. 16, 1920.

Application filed November 8, 1916. Serial No. 130,242.

*To all whom it may concern:*

Be it known that I, HENRY KENYON BURCH, residing at Miami, in the county of Gila and State of Arizona, a citizen of the United States, have invented or discovered certain new and useful Improvements in Hoisting Apparatus, of which improvement the following is a specification.

The invention described herein relates to certain improvements in apparatus for hoisting material and has for its object a construction providing for the intermittent discharge of the material in weighed quantities into skips or hoisting cars, the operation of the discharging and weighing mechanism being controlled by such skips or cars. The invention is hereinafter more fully described and claimed.

In the accompanying drawings forming a part of this specification, Figure 1 is a sectional elevation showing the upper portions of twin discharging and weighing mechanisms; Fig. 2 is a sectional elevation on planes indicated by the lines II—II Fig. 1, and including the lower portion of the hoisting shaft; Fig. 3 is a sectional view on an enlarged scale of one of the discharging and weighing mechanisms; Fig. 4 is an elevation showing the twin feed rollers and their operating mechanisms; Fig. 5 is an elevation of the hopper and weighing mechanism carrying the latter; Fig. 6 is a perspective view showing the mechanism for controlling the discharge of material from the weighing hopper; and Fig. 7 shows in elevation the twin weighing hoppers and their gates and mechanism for operating the same.

In the practice of the invention, a chute 1 is arranged at the discharge end or opening in the pocket 2 to direct the ore down onto the feeder roll 3. The front wall of this chute is formed by a movable feed gate 4, preferably pivotally mounted, as shown in Figs. 1, 3 and 4 and adapted to be operated by the hand wheel 5, the shaft of which is provided with a pinion 6 intermeshing with the gear wheel on the shaft 7, having a pinion thereon adapted to intermesh with a rack 8 of the feeder gate. By reference to Fig. 3, it will be seen that the front wall of the feeder chute is in a plane to the one side of the axis of rotation of the feeder roll, the eccentricity being on the opposite side of the direction of rotation of the upper portion of the feeder roll, so that material resting on the roll will have no tendency to move off of the roll unless such tendency is imparted by the rotation of the roll in the direction of the arrow. The amount of material carried forward on the rotation of the roll will depend upon the position of the feeder gate 4. On the shaft carrying the feeder roll 3 is secured a ratchet wheel 10, adapted to be moved step by step by a pawl 11 pivotally mounted on a swinging arm 12. This arm is connected by a link 13 to a crank disk 14 adapted to be rotated through suitable gearing by the belt 15, which is driven by a suitably located motor, as shown in Fig. 3. As the ore is carried forward, it will drop off the roll into the weighing hopper 16, to which is secured a yoke 17 carrying at its upper end a bearing block 18 adapted to bear on the knife edge 19 of the movable supporting beams 20. One end of these beams 20 bears upon knife edges 21, while their opposite ends are connected to a cross beam 22, which in turn has its middle portion connected by a loop 23 to one end of the scale beam 24, having its fulcrum at 25 and having weights 26 connected to its outer end, as shown in Figs. 4 and 5. The lower end of the weighing hopper is closed during the filling of the latter, by a gate 27, which is adapted, when dropped, as hereinafter described, to direct the material from the weighing hopper into a chute 28 by which the ore is directed into a hoisting car resting on suitable supports below the mouth of the chute 28, as shown in Figs. 2 and 7. A yoke 29 is connected to a corner of the gate 27 and is provided at its upper end with an arm through which passes a pin 30, said pin passing also through arms 31 secured on shafts 32 and 32ª. The several parts are so constructed that when the shaft is rotated to raise the gate 27, the link connecting the yoke to the pivot pin will pass beyond the axes of the shafts 32—32ª, thus locking the gate in closed position as shown in Fig. 6.

A lever 33 is so located in the skip shaft that when the skip approaches its support at the lower end of the shaft, as shown in Figs. 2 and 7, it will push down such lever and through the link 34 shift the angular lever 35 and thereby through the rod 36 and arm 37, turn the shafts 32—32ª so that the arms 31 and their connections to the yoke 29 to unlocked position, will move out, whereupon the weight of the material on the gate 27 will force the latter down against the pressure of the counterpoise, permitting the material to flow down into the chute 28 and then into the skip. The arm 37 is loosely mounted on the shaft 32ª so that the latter when rotated by the movement of the gate will not cause any further movement of the arm 37. Sufficient movement is transmitted from the arm to the shaft by a finger 38 secured on the shaft and projecting into the path of movement of a projection 39 on the arm 37, when actuated by the skip as hereinbefore described to unlock gate 27. The gate 27 has a counterbalance 40 which will return the gate to normal or closed position when relieved from the weight of the ore in the weighing hopper. This movement of the gate to closed position will throw the arms 31 into normal or locking position, thereby locking the gate in closed position. In order to counterbalance the weight of the arms 31 and their connections, a sector 41 is secured to the shaft 32 and to this sector is connected one end of a cord 42 having a weight at its opposite end, said parts being so constructed and proportioned that when the shaft 32 is rotated by the opening movement of the gate the cord carrying the weight will be wound on the sector, thus permitting a full movement of the arm while maintaining a counter balance or weight during such movements.

On the shaft 32 is secured an arm 43 adapted, when the gate is in closed position, to bear on a pivotal arm 44, having its free end connected by a rod 45 to a lever 46 provided with an angular arm 47, having a hook at its end adapted to engage a projection on a pawl-lifting lever 48. As shown in Figs. 3 and 4, this lever is so arranged that under normal conditions the pawl 11 can ride therealong and engage the ratchet wheel 10, but when said lever is shifted as hereinafter described, it will raise the pawl so that, although its reciprocation is continued, it will not engage the ratchet wheel 10. When the scale beams 20, 22 and 24 are shifted by the weight of the material in the weighing hopper, one end of a lever 49 will be so shifted by the upward movement of the scale lever as to allow its opposite and weighted end to bear upon the power end of the lever 48, thereby so shifting this lever as to raise the pawl 11 out of engagement with the ratchet wheel. As before stated, this lifting of the pawl is coincident with the downward movement of the weighing hopper, so that during the discharge of such hopper, no ore or other material may be fed thereinto.

It will be understood that as soon as material begins to be discharged from the weighing hopper, it will immediately be raised to normal position by the weight 26, operating through the scale beams 20, 22 and 24, and this movement of the scale beams will so shift the lever 49 as to permit the pawl 11 to engage the ratchet wheel. Such engagement of the pawl with the ratchet wheel and the consequent feeding of material into the weighing hopper should not occur until after the hopper gate 27 has been closed. This retarded operation is effected by the release of the pivoted arm 44 on the movement of the shaft 32 to locked position and the consequent shifting of the lever 46 by its weight in such direction as to cause the hook on the arm 47 to engage and hold the pawl-lifting lever 48 from movement, although released by the movement of the lever 49, until after the hopper gate is closed and the arm 44 depressed by the arm 43 and the hook on the arm 47 shifted out of engagement with the pawl-lifting lever. As soon as this occurs, feed will be immediately resumed.

In order to prevent injury to the feeder roll by the dropping of ore thereonto from the mine cars, when the pocket and chute 1 are empty, provision is made for maintaining a bed of ore in the chute. To this end, gates 50, carried by a shaft 51 are so arranged that the gates may be shifted into the chute from the ore pocket when the ore drops below the level of such gates, by the weight 52. The arm carrying the weight is connected by a link 53 to the pawl-lifting lever 48, so that when the gates are shifted into the chute or passage from the ore pocket, the pawl-lifting lever 48 will be raised, thereby preventing any further feed of material out of the chute 1 until the gates are again pressed outward by material fed into the pocket and the chute.

As it is customary to employ hoisting mechanism, embodying two oppositely moving skips or cars, the improvements claimed herein are shown in connection with such twin hoisting mechanism. The mechanisms for controlling the movements of the materials from the storage pockets to the respective weighing mechanisms and the discharge of the material from the latter into the respective cars are independent, the one from the other, and for convenience and clearness the index character $a$ is applied to the reference numeral of one of the duplicate apparatus. While the mechanisms for operating the feed rolls 3 can be operated independently, it is preferred to employ a single motor and to connect the pawl operating arms 12 12ª to the crank disk 14 by pitmen 13—13ª, as shown in Figs. 1, 3 and 4.

I claim herein as my invention:

1. In a hoisting apparatus, the combination of a storage pocket, a vertically movable container, means for controlling the movement of material from the storage pocket into the container and controllable by the movements of the container, a skip or hoisting car, and means for controlling the discharge of material from the container and controllable by the skip.

2. In a hoisting apparatus, the combination of a storage pocket, a movably supported container, means for moving the material from the pocket into the container and controllable by the movements of the container, a skip or hoisting car, means for controlling the discharge of material from the container and controllable by the skip, and a lock for preventing the operation of the material moving means during the discharge of material from the container.

3. In a hoisting apparatus the combination of a storage pocket, a movably supported container, means for controlling the movement of the material from the pocket into the container and controllable by the movements of the container, a skip or hoisting car, means for controlling the discharge of material from the container and controllable by the skip, and a lock for preventing the operation of the material moving means during the discharge of material from the container.

4. In a hoisting apparatus the combination of a storage pocket, a chute for conducting the material from the pocket, means for moving the material from the chute and means controllable by the material moving through the chute and controlling the operation of means employed for moving the material.

5. In a hoisting apparatus, the combination of a weighing mechanism embodying a container, a door for such container counter balanced to return to closed position, a skip and means for holding the door in closed position, and adapted to be shifted to release the door by the skip of the hoisting mechanism.

6. In a hoisting apparatus, the combination of a skip, a weighing mechanism embodying a container arranged to discharge into the skip when in receiving position, means for directing material into the container, a door for the container counterbalanced to return to closed position, means for holding the door in closed position and adapted to be shifted to release the door by the movement of the skip to receiving position, means operative by the door when opened to lock the material directing means and to release such means on the return of the door to closed position.

In testimony whereof I have hereunto set my hand.

HENRY KENYON BURCH.

Witness:
BERTHA M. HUNT.